United States Patent [15] 3,677,197
Hounshell et al. [45] July 18, 1972

[54] FLEXIBLE MOVABLE ENCLOSURE FOR VEHICLES

[72] Inventors: James R. Hounshell, Flat Rock; William L. Pringle, Grosse Pointe Shores, both of Mich.

[73] Assignee: Pullman Incorporated, Chicago, Ill.

[22] Filed: Aug. 21, 1970

[21] Appl. No.: 65,832

[52] U.S. Cl. ..........................105/378, 105/368 R, 105/367, 105/409
[51] Int. Cl. ..................................B61d 17/08, B61d 19/00
[58] Field of Search ...........105/366, 368 R, 367, 340, 392.5, 105/378, 377, 409; 296/28 M, 155

[56] References Cited

UNITED STATES PATENTS

| 1,405,485 | 2/1922 | Caffery | 105/378 |
| 1,274,789 | 8/1918 | Schedlbauer | 105/377 |
| 2,167,306 | 7/1939 | Kundert | 105/377 |

*Primary Examiner*—Drayton E. Hoffman
*Attorney*—Hilmond O. Vogel

[57] ABSTRACT

A vehicle such as a railway car or over-the-highway carrier is provided with a floor and roof construction which defines a cargo space enclosed by a flexible sliding wall of endless configuration. The wall includes an opening which upon the operation of an actuating mechanism is moved to a plurality of longitudinally spaced positions providing access to the cargo space from opposite sides of the vehicle. In one of the positions a solid vertical wall section masks the opening in the wall and the cargo space is fully enclosed.

A modified construction includes a pair of flexible wall sections which are moved to open and closed positions by winch mechanisms.

9 Claims, 7 Drawing Figures

Patented July 18, 1972

INVENTORS
JAMES R. HOUNSHELL
WILLIAM L. PRINGLE
BY Helmuth O. Vogel ATT'Y.

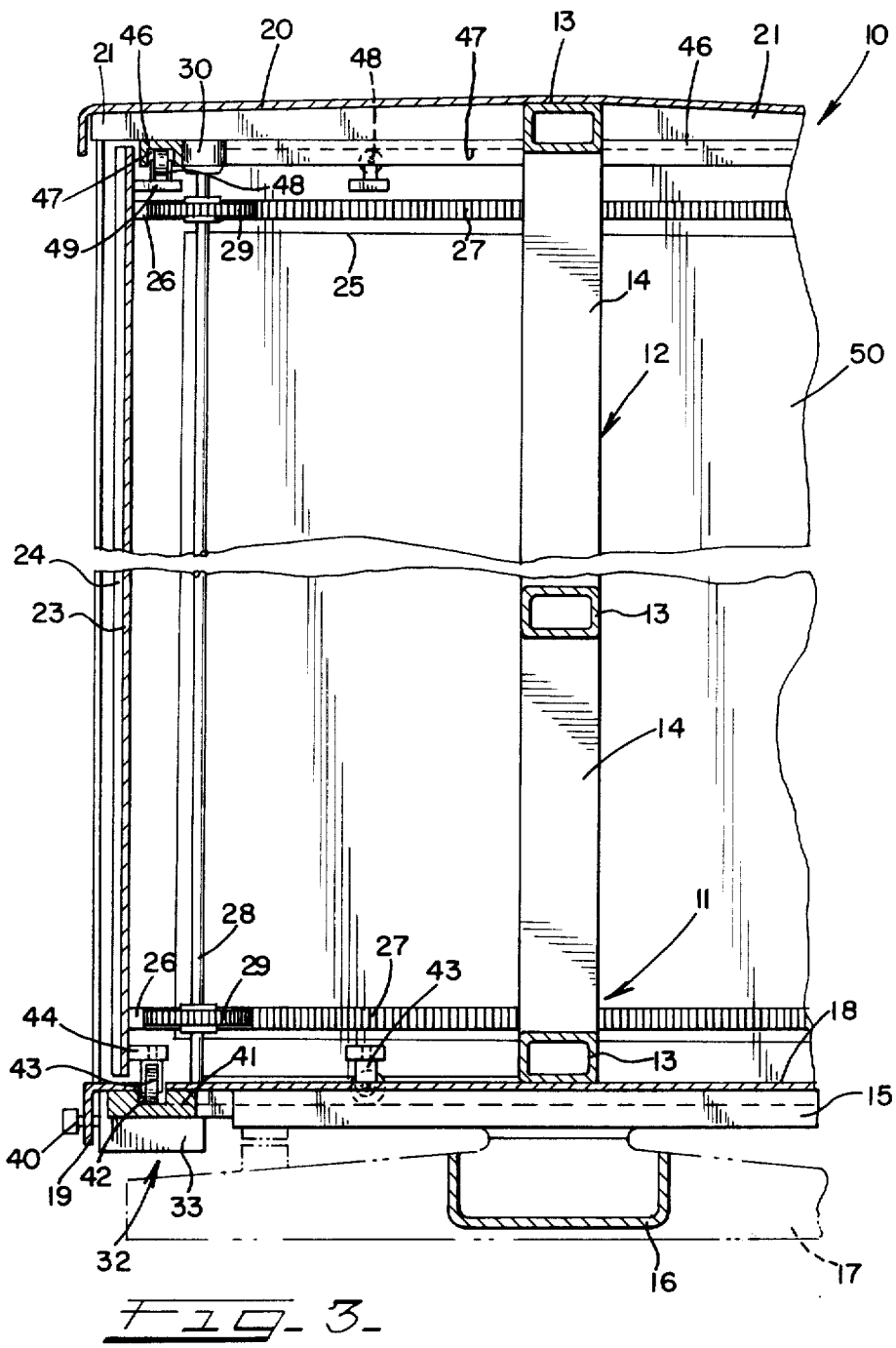

Patented July 18, 1972 3,677,197
4 Sheets-Sheet 4
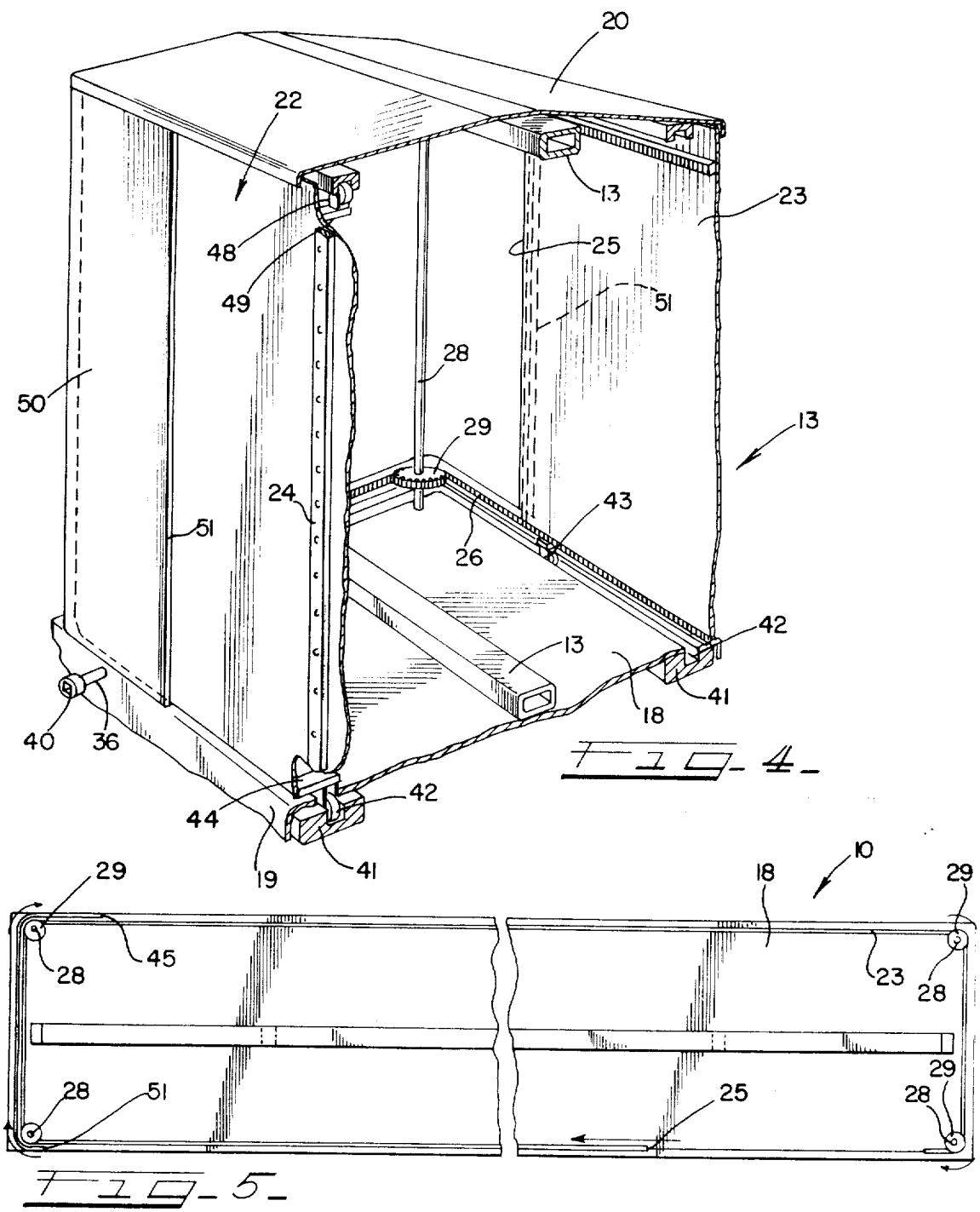
INVENTORS
JAMES R. HOUNSHELL
WILLIAM L. PRINGLE
BY Helmuth O. Vogl
ATT'Y

FLEXIBLE MOVABLE ENCLOSURE FOR VEHICLES

SUMMARY

The primary object of this invention is to provide an improved enclosure for a vehicle such as a railway car or highway carrier wherein the enclosure comprises a wall of flexible material which extends around the peripheral edges of the roof and floor of the vehicle in endless fashion. The wall includes an opening which upon movement of the wall, by means of a suitable drive mechanism, positions the opening in a plurality of longitudinally disposed positions, so that access to the interior of the vehicle is easily provided immediately adjacent to the cargo space which is to be loaded or unloaded. The invention is particularly well suited to the type of vehicle shown in assignee's co-pending application, Ser. No. 65,831, filed Aug. 21, 1970, which includes a cargo-carrying truss type of frame structure of relatively narrow configuration suitably stabilized on ground wheels and permitting the cargo to be suspended directly on opposite sides of the structure, with said truss frame supplying the main structural components of the vehicle. The invention further includes a modified split or sectional type of flexible enclosure including winch mechanisms which function to move the enclosure to an open or closed position.

BRIEF DESCRIPTION OF THE DRAWINGS

FIG. 3 is a cross-sectional view taken substantially along the line 3—3 of FIG. 2;

FIG. 4 is a perspective view of an end portion of a railway car;

FIG. 5 is a schematic view of a railway car having a movable flexible enclosure;

FIG. 7 is a schematic view of a modified flexible enclosure for a railway car.

DETAILED DESCRIPTION

Figure 1:
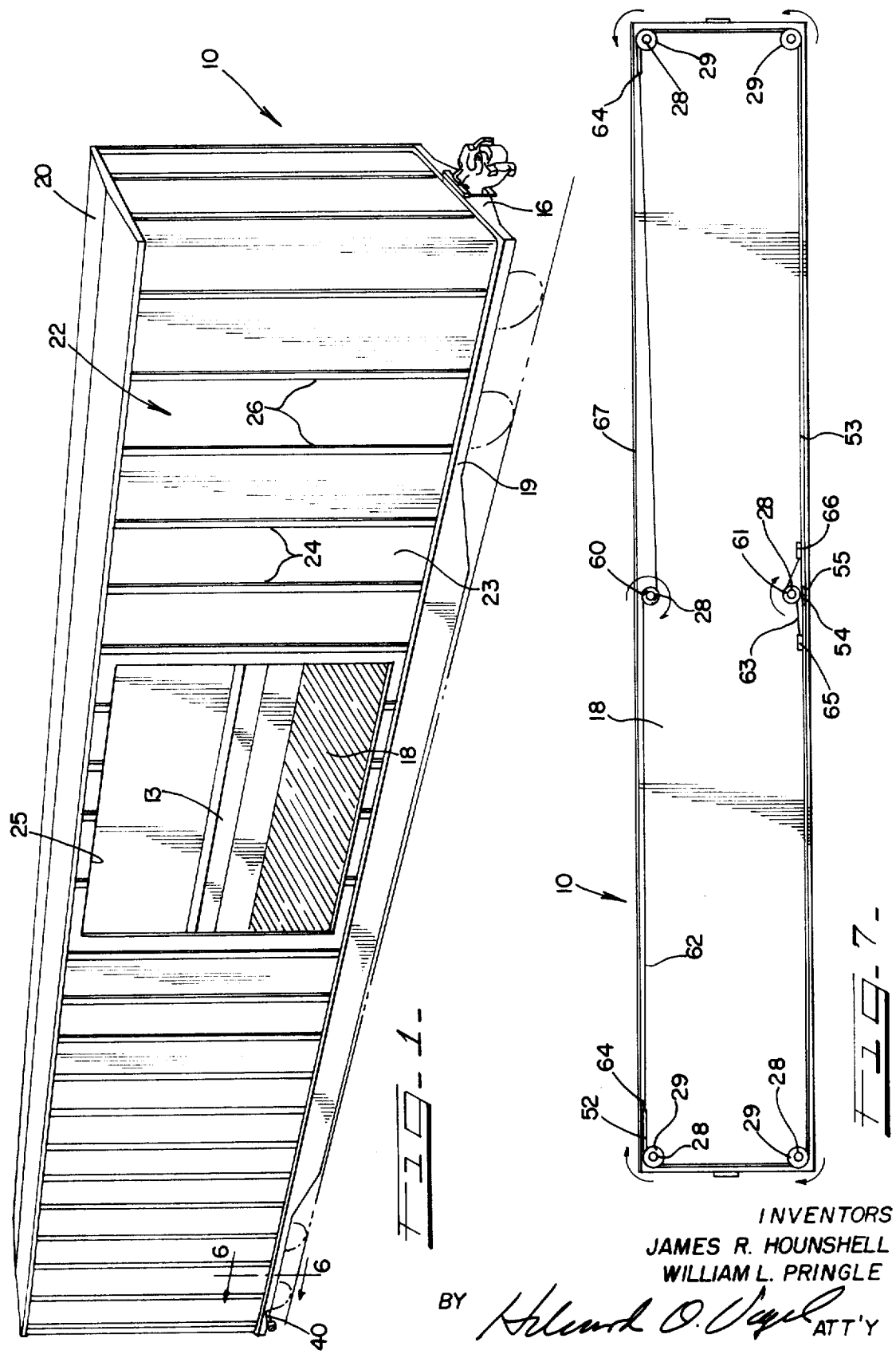
FIG. 1 is a perspective view of a railway car.

Referring to FIGS. 1-6, a railway car or vehicle 10 includes a frame 11 which comprises primarily a truss type structure 12 which includes longitudinally extending beams 13 relatively vertically spaced and interconnected by vertical beam members 14. The lowermost beam 13 is connected at opposite ends to laterally extending stabilizing plates 15, having connected thereto outwardly projecting stub center sill sections 16, which may have conventional car couplers connected thereto. A truck bolster 17 is schematically disclosed and the vehicle is supported in conventional fashion as disclosed in the aforementioned application. The latter also discloses a trailer vehicle which may include the improved constructions hereinafter disclosed.

Figures 2, 6:
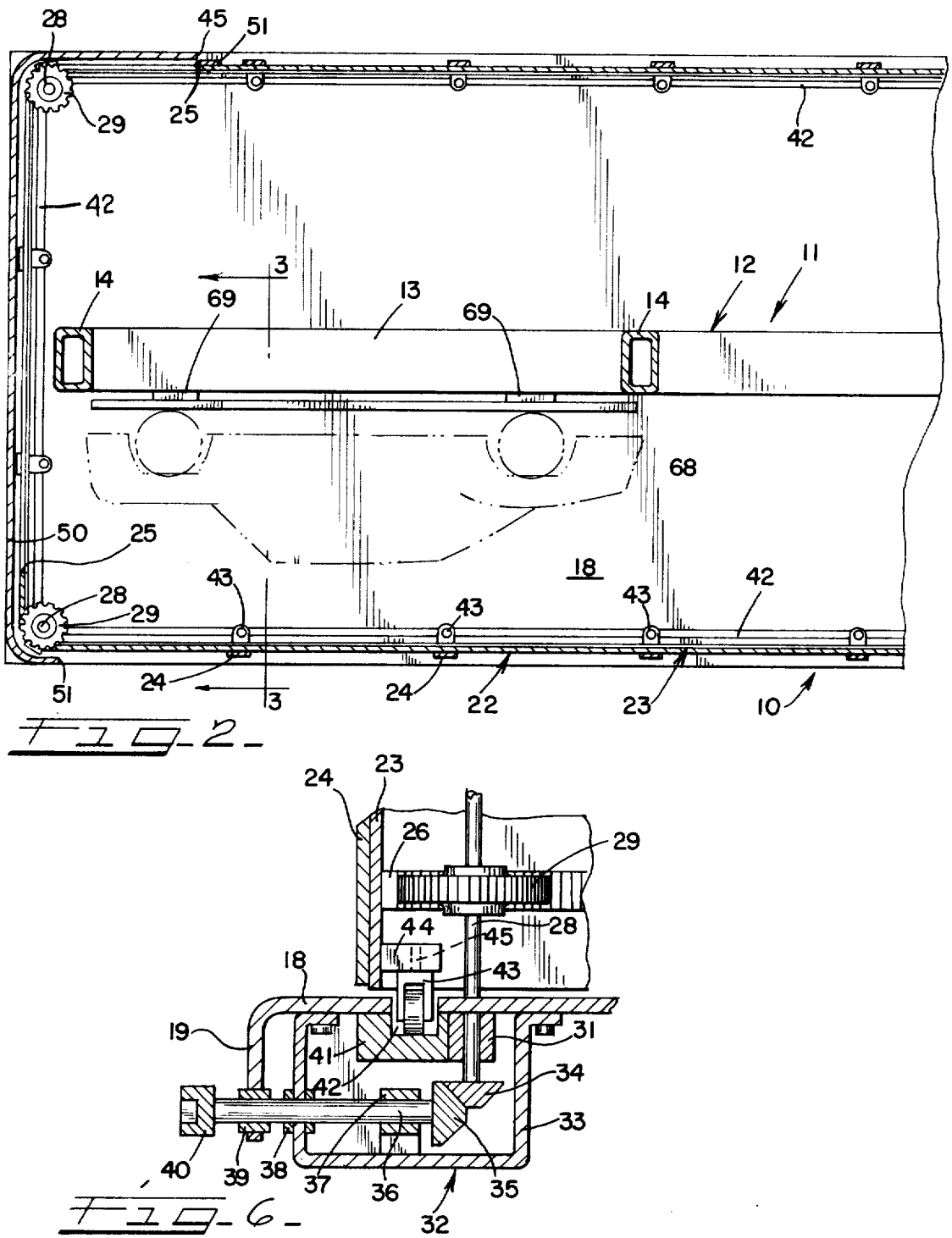
FIG. 2 is a sectional view through a railway car showing in plan a floor structure and cargo carried within said car.
FIG. 6 is a cross-sectional view of a driving mechanism for moving a sliding wall.

The car 10 includes a floor 18 provided at its opposite sides with downwardly turned flanges 19. A roof structure 20 is supported on the upper beam 13 by means of a plurality of longitudinally spaced and laterally extending roof beams 21. A cargo-containing space defined by the roof structure 20 and floor 18 is enclosed by means of an enclosure generally designated at 22. The enclosure 22 consists of an endless flexible wall (or curtain) 23 which may be made of a suitable flexible plastic, such as fiberglass, etc. or of a metal-slatted interconnected construction which permits the wall to be slidingly movable longitudinally and laterally along the peripheral edges of the floor 18. The flexible wall 23 includes a plurality of vertical reinforcing slats 24 horizontally spaced and suitably connected to the wall 23 to provide for vertical stabilization. The wall 23 also includes an access opening 25 which during movement of the wall 23 is adapted to be positioned in a plurality of longitudinally spaced positions so that cargo immediately in lateral alignment with the opening 25 may be expeditiously removed. The wall 23 also is provided with upper and lower driven bands of flexible material 26 provided with serrations or teeth 27, as best shown in FIG. 3. The flexible material may be plastic or any material which permits the curtain to be moved horizontally, then longitudinally and then laterally as will be described in more detail. At the four corners of the vehicle 10, there are provided rotatable shafts 28 on which upper and lower sprockets 29 are secured. Each shaft 28 is rotatable in upper and lower bearings 30–31 respectively. The upper bearing 30 is suitably connected to one of the projecting roof beams 21 and the lower bearing 31, as best shown in FIG. 6, is adapted to be suitably supported beneath the floor 18. Gear drive mechanisms 32 are positioned below the shafts 28 on opposite sides of the car at one end thereof so that access to operate the gear drive mechanisms 32 is available from opposite sides of the car. Each mechanism 32 includes a housing 33 suitably connected to the underneath side of the floor 18. As best shown in FIG. 6, a pinion 34 is connected to the bottom end of each shaft 28 and is enmeshed with a pinion 35 rotated by means of a shaft 36 supported in a bearing 37 suitably supported by the housing 33. The shaft 36 projects through the housing 33 and a bearing 38 and in turn is supported at one end by a bearing 39 supported in the downwardly extending flange 19 on each side of the floor 18. The shafts 36 are rotated by means of a socket head 40 which may be engaged by a suitable driving device such as an air motor or may be actuated by a suitable lever in the event of hand actuation.

As best shown in FIG. 3, a guide member 41 is suitably secured to the underneath side of the floor 18 and includes grooves or slots 42 which with the guide member 41, as also shown in FIG. 2, extends completely around the peripheral edge of the floor 18. The grooves 42 support lower guide wheel assemblies 43 which are suitably swiveled in brackets 44 in turn connected to the flexible wall 23. An upper guide member 46 is suitably connected to the roof beams 21 and extends around the peripheral edge of the roof structure 20 in vertical alignment with the guide member 41. The upper guide member 46 also includes the downwardly opening groove 47 in which a upper guide wheel assembly is positioned for rolling or sliding movement. The wheel assembly 48 is swivelingly connected to brackets 49 also suitably connected to the wall 23, as best shown in FIG. 3.

As best shown in FIGS. 2 and 3, an upright end wall 50 is provided at opposite ends of the vehicle 10 and, as best shown in FIG. 2, on the one side of the vehicle terminates at the edge 45 and on the other side of the vehicle, the said wall 50 terminates at the edge 51. The wall 50 has a height and width extension greater than the opening 25 so that as shown in FIGS. 2 and 3, in the closed position of the enclosure the said opening is masked by the end wall 50. The end wall 50 at the opposite ends of the car serve a similar purpose if the opening 25 is disposed adjacent said wall for closing the car.

THE OPERATION

In the embodiment shown in FIGS. 1–6, the enclosure for enclosing cargo carried within the vehicle is completely closed when the opening 25 is masked by one of the end walls 50. To open any longitudinally spaced portion on one side of the car, it is a simple matter to rotate the shaft 36 by a suitable air motor (not shown) which engages the socket head 40 thereupon causing rotation of the shaft 28 which in turn drives the sprockets 29. The sprockets 29 may also be of a suitable plastic construction such as nylon, etc. which engages the flexible straps 26 and serrations 27 in driving relation whereupon the endless wall 23 is moved in a longitudinal direction along the longitudinal edges of the car and laterally across the car. Thus the opening 25 may be positioned in a plurality of positions along the opposite sides of the car so that ready access may be had to the interior of the car for loading and unloading cargo. In FIG. 2 the cargo is indicated as being automobiles 68 which may be suitably connected by means of brackets 69 to the truss structure 12 and thereby be suspended thereon.

MODIFIED FORM OF THE INVENTION

A modification of the invention is shown in FIG. 7. In this particular modification the enclosure is provided with a pair of flexible wall sections 52 and 53 having adjacent vertical ends 54 and 55 which may be relatively separated to provide an opening which may extend the whole side of the car for providing access to the interior thereof. The flexible sections 52 may be of similar construction as indicated hereinabove and include the guide wheel assemblies and related structure, these not being shown in further detail. The shafts 28 and sprockets 29 are of similar construction and are disposed at opposite ends of the car. In addition however the structure also includes winch mechanisms or drums 60 which are positioned substantially centrally of the car as shown and the drums 60 and 61 are vertically spaced on the shafts 28 and are connected to a cable 62 which is suitably connected to ends of the sections 52 and 53. In this case the drums 60 and 61 may be rotated by the same mechanism 32 which is shown in FIG. 6. Upper and lower cables are provided for each of the drums 60 and are suitably connected to ends of the sections 52 and 53 as indicated at 64. The drums 61 also have upper and lower cables 63 connected thereto, the said connection being indicated at 65 and 66 to the opposite ends of the sections 52 and 53. In the modification disclosed in FIG. 7, only one side of the car is opened for unloading and the other side is closed by means of a vertically extending solid wall 67 which extends between the floor and the roof to enclose one side.

In the operation of the modification shown in FIG. 7, the sections 52 and 53 are moved by rotation of the drums 60 which causes the ends 54 and 55 to become separated until the one side of the vehicle is completely opened. Upon such movement the drums 61 move in a reverse direction whereupon the cables 63 are unwound from the drums.

When it is desired to close the sections 52 and 53 as shown in FIG. 7, the drums 61 are actuated to wind the cables 63 onto said drums and whereupon the sections 52 and 53 are again rolled to the closed position.

What is claimed is:

1. A vehicle comprising a supporting frame:
a floor supported on said frame,
a roof structure supported on said frame over said floor and providing therebetween a cargo space,
an enclosure for said space including an upright flexible wall carried on said floor along peripheral edges thereof,
said flexible wall being horizontally moveable and extending continuously in endless fashion about said vehicle,
said wall including an opening adapted to be positioned along longitudinally spaced positions of said space,
driven means including a flexible member on said wall, and
power actuated drive means supported on said frame engaging said driven means for moving said flexible wall horizontally, and
a wall portion positioned along a peripheral edge of said frame and having a height and width at least equal to said opening, and said opening in one position being masked by said wall portion whereby said space is substantially enclosed by said enclosure.

2. The invention in accordance with claim 1,
said frame including an upright truss type structure including longitudinally and vertically extending interconnected beams,
said structure having a relatively narrow width and said cargo space being disposed on opposite sides thereof, and
means connecting cargo to said structure on opposite sides thereof in said space and being accessible thereto as said opening is moved to said plurality of positions.

3. The invention in accordance with claim 1,
including a pair of upright guide elements positioned adjacent laterally opposite corners of one end of said vehicle, said flexible wall being movable laterally and longitudinally in engagement with said guide members,
said actuating means including first winch means having a first drum rotatably positioned on said vehicle,
a first flexible member connected to one end of said flexible wall and to said first drum,
a second winch means having a second drum rotatably positioned on said vehicle, and
a second flexible member connected to an opposite end of said flexible wall where upon actuation, said flexible wall is moved to open and closed positions.

4. The invention in accordance with claim 1,
including a pair of upright guide elements positioned adjacent laterally opposite corners of opposite ends of said vehicle,
said flexible wall including longitudinally spaced sections each being movable laterally and longitudinally in engagement with a pair of said guide members,
said actuating means including first winch means having a first drum rotatably positioned on said vehicle,
flexible means connected to first ends of said sections and to said first drum,
second winch means having a second drum rotatably positioned on said vehicle, and
second flexible means connected to opposite ends of said sections where upon actuation, said flexible sections are moved to open and closed positions.

5. The invention in accordance with claim 12,
said vehicle including a rigid upright wall connected to said floor and said roof structure on one side of said vehicle and extending substantially the length thereof,
said opposite ends of said second sections in said open position being in longitudinally spaced adjacent relation and substantially contiguous to said upright wall whereupon said opening extends substantially the length of said vehicle on the opposite side thereof.

6. A vehicle comprising a supporting frame:
a floor on said frame,
a roof structure on said frame substantially coextensive with said floor,
cargo support means on said frame,
an enclosure disposed between said roof structure and said floor including an endless vertical wall,
means slidably guiding said wall on said roof structure and floor,
said wall having an opening movable with said wall to a plurality of longitudinally spaced positions on a side of said vehicle to provide access to said cargo support means,
driven means on said wall, and
drive means on said vehicle for driving said driven means to move said endless wall and said opening to said positions.

7. The invention in accordance with claim 6,
said endless vertical wall comprising a flexible material, and
said slidable guiding means including guide elements extending along the peripheral edges of said floor and roof and connected respectively to lower and upper portions of said wall.

8. The invention in accordance with claim 7,
said slidable guiding means including rotatable members positioned adjacent four corners of said floor for rotation about vertical axes,
said endless wall extending and being disposed around said rotatable members, and
said drive means being connected to drive said rollers to drive said driven means on said walls.

9. The invention in accordance with claim 6,
including a vertical wall portion connecting said roof and said floor,
said portion having a height and width at least equal to said opening to mask and close the same in one position of said wall.

* * * * *